Aug. 5, 1930.  P. H. DAVEY  1,772,071
TRACTOR ATTACHMENT
Filed Aug. 10, 1929  2 Sheets-Sheet 1

INVENTOR
Paul H. Davey
BY
George O. ...
ATTORNEY

Aug. 5, 1930. P. H. DAVEY 1,772,071
TRACTOR ATTACHMENT
Filed Aug. 10, 1929  2 Sheets-Sheet 2

INVENTOR
Paul H. Davey
BY
ATTORNEY

Patented Aug. 5, 1930

1,772,071

UNITED STATES PATENT OFFICE

PAUL H. DAVEY, OF KENT, OHIO, ASSIGNOR, BY DIRECT AND MESNE ASSIGNMENTS, TO DAVEY DEVELOPMENT COMPANY, OF KENT, OHIO, A CORPORATION OF OHIO

TRACTOR ATTACHMENT

Application filed August 10, 1929. Serial No. 385,001.

My present invention relates more particularly to that class of tractor attachments which comprises some form of bracket anchored on the rear axle housing of the tractor and used to support or afford anchorage for some supplemental apparatus, illustrative examples being found in Patents Nos. 1,443,548, 1,478,428, 1,648,751, 1,715,779, 1,653,020, etc., and my present invention relates more particularly to proper lateral bracing of such housing attachment, in combination with a suspension cantilever particularly designed to take the strain off the housing when the bracket is used for a heavy load.

In the particular case illustrated herein, the load to be carried consists of an air compressor adapted to be driven from the power cross shaft commonly provided in such tractors. The specific design and arrangement of parts provides a belt drive connection and the lateral bracing, referred to above, as well as the cantilever construction, are well adapted to afford an outside bearing support against the tension of the belt when under its normal driving load.

Figure 1:
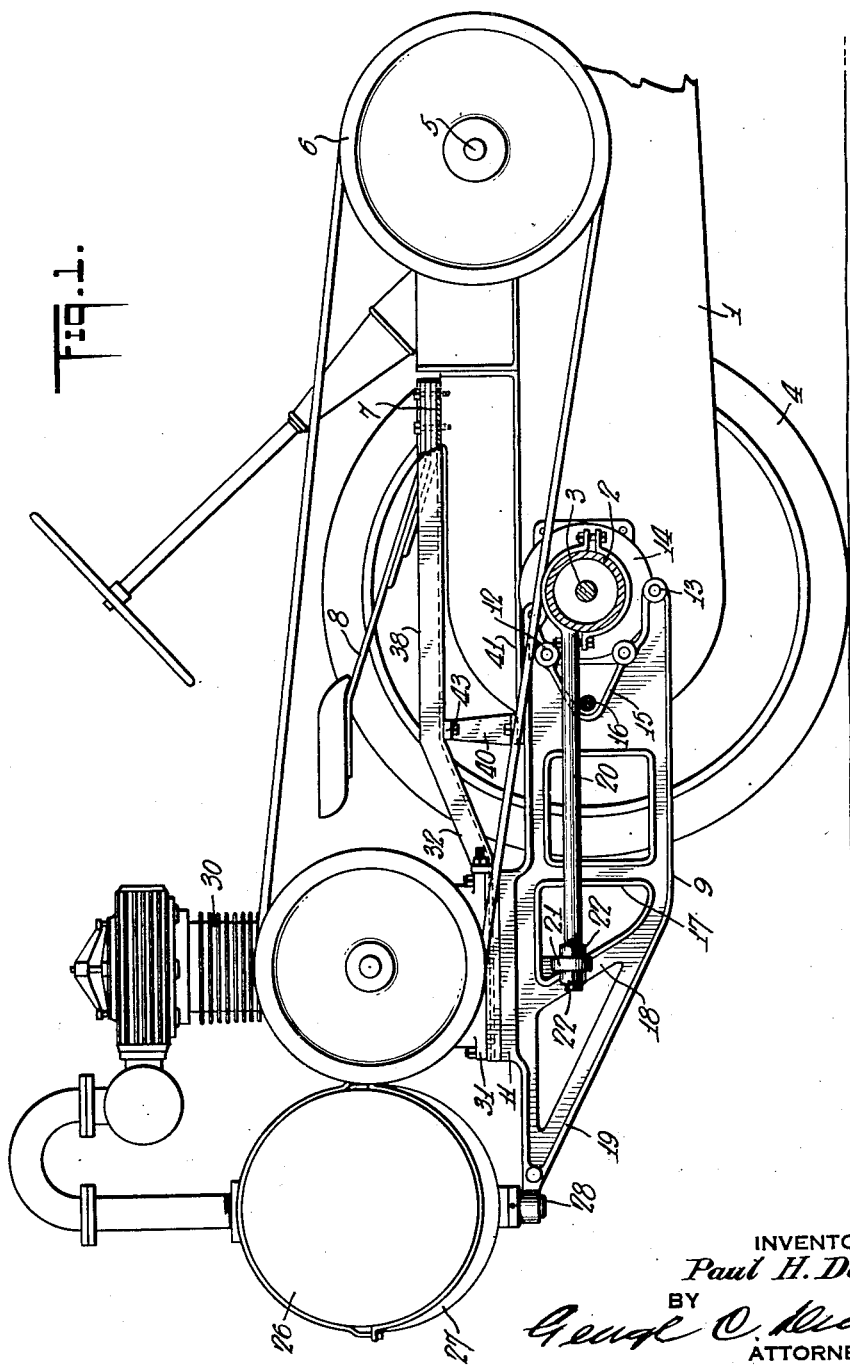
Figure 2:
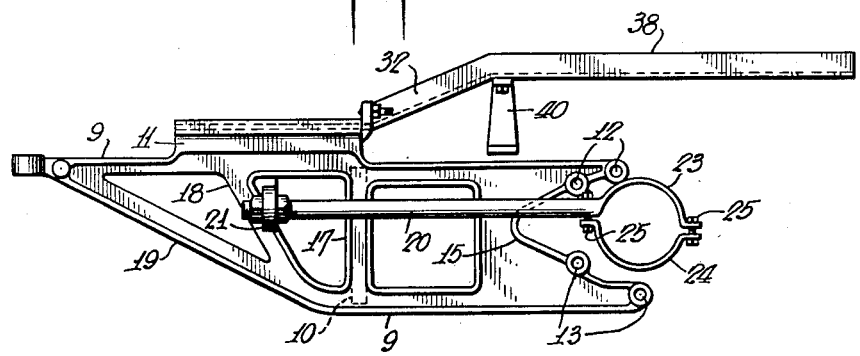
Figure 3:
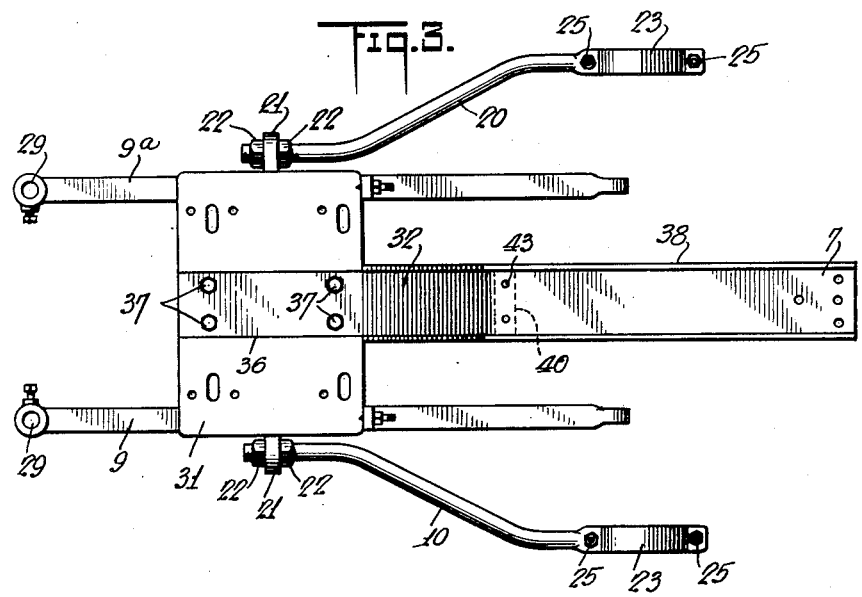
Figure 4:
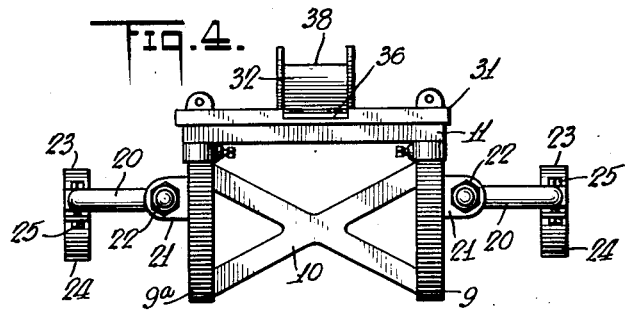

The above and other features of my invention may be more fully understood from the following description in connection with the accompanying drawings, in which Fig. 1 is a side elevation of my attachment as applied to the rear end of a tractor, the axle housing being shown in section adjacent the tractor wheel;

Fig. 2 is a side elevation of the bracket with the side braces and cantilever suspension assembled in operating position; and Figs. 3 and 4 are respectively a top plan view and a rear elevation of the parts shown in Fig. 2.

The rear portion of the tractor is conventionally indicated as comprising crank case 1 having bolted to the sides thereof the rear axle housing 2 containing axle 3 for the tractor wheels 4. 5 is the transverse power shaft commonly installed in such tractors, and 6 is the drive pulley on said shaft.

In the particular form shown, the upper member of the crank case has an elevated narrow seat 7, to which the spring seat 8 is bolted. It will be understood that the crank case is quite narrow, usually not much more than half the width between the tractor wheels, and the anchorage for the spring seat is much narrower than the crank case.

The attachment for the above or any other tractor having a crank case and housing includes a bracket platform the bracket portion of which comprises two parallel members 9, 9ª, the length of which may be varied according to the size and nature of the load to be carried. Preferably, these members are cast integral with a diagonal bracing web 10 (Fig. 4) and there is a transverse platform member 11 which may be integral with the casting or may be a separate plate. Obviously also the members 9, 9ª, 10 may be separate pieces bolted together. The casting is formed at its rear end with upper bolt holes 12 and lower bolt holes 13 arranged approximately in the arc of a circle for bolting to the periphery of the central enlargement 14 of the rear axle housing. In the form shown, the casting is cut away to form a rearward V-recess 15 to accommodate the brake operating shaft 16. While these bracket members may have imperforate webs, I prefer to skeletonize them, without substantial decrease in strength, leaving only a vertical portion 17 and two diagonal portions 18, 19. As the diagonal spacer members 10 which resist skewing strains upon the members 9, 9ª, have little strength as against a side strain or blow on the end of the structure, I insure against the latter strains by providing a pair of diagonal braces in the form of rods 20, 20, the rearward ends of which are securely locked in ears 21 integral with the casting, by means of clamping nuts 22, 22. As best shown in Fig. 3, these lateral braces diverge forwardly and are secured to the rear axle housing closely adjacent the outer traction wheels, by means of a clamping banding comprising a member 23 which may be integral with the brace rod 20, and a member 24 adapted to be secured in tight clamping engagement with the rear axle housing by means of nuts and bolts 25, 25.

In the present case, the load consists of a relatively light storage tank 26, for compressed air, which is supported in two cradle segments 27, 27, each having a downwardly projecting stud 28 passing through vertical sockets 29, 29, formed in the extreme rear ends of the members 9, 9ª.

The main load, which is the air compressor 30, is carried by the platform 11. Preferably, the base plate 31 of the compressor is bolted to the platform 11 and the compressor 30 then bolted to said base.

As before stated, I preferably combine with the above, means for diagonally bracing the attachment against vertical strains, in the form of a cantilever consisting of a channel iron formed with a downward slanting portion 32 forming a weight arm of a bent lever and also serving the function of a brace against vertical stresses. The rear end of this lever is secured to the platform 11, preferably by securing it in a recess 36 in the upper surface of the base plate 31 of the compressor, as by bolts 37.

The power arm 38 of this lever is a horizontally extending portion which may be bolted to the seat 7 on the crank case, using the same bolt holes that were primarily employed to hold the driver's seat. The driver's seat may be omitted or may be secured by the same bolts that hold the lever as shown in Fig. 1, if desired. The fulcrum of the lever is on a pier 40, preferably bolted to the horizontal flange 41 of the crank case and preferably also to the fulcrum point of the lever, as shown at 43.

By reference to Figs. 2 and 3, it will be seen that I have succeeded in working out an extremely stable, well braced structure. For instance, from Fig. 3 it may be seen that the clamping points of the side braces are nearly twice as far apart as are the ends of frame members 9, 9ª, that are bolted to the axle housing. By reference to Figs. 2 and 4, it will be seen that the crank case itself forms in effect a triangular structural base connection or brace between lower bolt holes 13 and the top of the pier 40 on which the lever 32, 38 is fulcrumed, a triangle drawn to connect these points on Fig. 4 being nearly equilateral.

There are many useful structural and functional features that will be evident to any one studying the proportions and relative arrangements of parts. For instance, the load bearing arm of the cantilever is connected to the attachment very nearly in the line of the center of gravity of said load. The bracket casting is more massive than it need be for structural strength, but this is preferable as affording a massive inertia body to take up the vibrations of the compressor when in operation. This weight, which might otherwise put an undue strain on the axle housing, is adequately taken care of by the cantilever. The weight being carried by the cantilever, the transverse thrust of the bracket on the axle housing is minimized and, by a proper height for the pier 40, may be completely eliminated; in fact, the bracket member might easily be arranged to tension away from the axle housing, if desired.

I claim:

1. An attachment for a motor vehicle of the type having a crank case rigidly associated with a rear axle housing including a platform member having its forward end anchored intermediate the ends of the axle housing, and having forwardly diverging lateral braces anchored on the axle housing, in combination with means for suspending the platform, said means including a forwardly and upwardly extending lever fulcrumed on a rear portion of the crank case and having a forward portion secured to the top of the crank case at a point remote from the fulcrum.

2. An attachment for a motor vehicle of the type having a crank case rigidly associated with a rear axle housing including a platform member having its forward end anchored intermediate the ends of the axle housing, and having forwardly diverging lateral braces anchored on the axle housing, in combination with means for suspending the platform, said means including a forwardly and upwardly extending lever fulcrumed on a rear portion of the crank case and having a forward portion secured to the top of the crank case at a point remote from the fulcrum, and with an intermediate portion free from engagement with said crank case.

3. An attachment for a motor vehicle of the type having a crank case rigidly associated with a rear axle housing including a platform member having its forward end anchored intermediate the ends of the axle housing, in combination with means for suspending the platform comprising a channel iron fulcrumed on a rear portion of the crank case and having a forward portion secured to the top of the crank case.

4. An attachment for a motor vehicle of the type having a crank case rigidly associated with a rear axle housing including a platform member having its forward end anchored intermediate the ends of the axle housing, in combination with means for suspending the platform comprising a channel iron fulcrumed on a rear portion of the crank case and having a forward portion secured to the top of the crank case at a point remote from the fulcrum.

5. An attachment for a motor vehicle of the type having a crank case rigidly associated with a rear axle housing including a platform member having its forward end anchored intermediate the ends of the axle housing, in combination with means for suspending the platform comprising a channel iron fulcrumed on a rear portion of the crank case and having a forward portion secured to the top of the crank case at a point remote from the fulcrum and with an intermediate portion free from engagement with said crank case.

6. An attachment for a motor vehicle of the type having a crank case rigidly associated with a rear axle housing including a platform member having its forward end anchored intermediate the ends of the axle housing, and having forwardly diverging lateral braces anchored on the axle housing, in combination with means for suspending the platform, said means including a forwardly and upwardly extending lever fulcrumed on a rear portion of the crank case and having a forward portion secured to the top of the crank case, said platform comprising cast members and said braces comprising rods secured to the platform by clamping nuts and to said housing by clamping bands.

7. An attachment for a motor vehicle of the type having a crank case rigidly associated with a rear axle housing including a platform member having its forward end anchored intermediate the ends of the axle housing, and having forwardly diverging lateral braces anchored on the axle housing, in combination with means for suspending the platform, said means including a forwardly and upwardly extending lever fulcrumed on a rear portion of the crank case and having a forward portion secured to the top of the crank case, said braces comprising rods secured to the platform by clamping nuts and to said housing by clamping bands.

8. An attachment for a motor vehicle of the type having a crank case with lateral extensions forming a rear axle housing, including a platform member having its forward end anchored at spaced-apart points on opposite sides of the crank case, and having forwardly diverging lateral braces anchored on the axle housing adjacent the ends thereof, in combination with central longitudinal means for suspending the platform from the crank case, rigidly supported upon a rear portion of the crank case and having its forward end secured to the top of the crank case.

9. An attachment for a motor vehicle of the type having a crank case with lateral extensions forming a rear axle housing, including a platform member having its forward end anchored at spaced-apart points on opposite sides of the crank case, and having forwardly diverging lateral braces anchored on the axle housing adjacent the ends thereof, in combination with central longitudinal means for suspending the platform from the crank case, rigidly supported upon a rear portion of the crank case, and having its forward end secured to the top of the crank case, the point of rear support of the suspension means by the crank case being substantially above the level and nearly in the vertical plane of and approximately midway between the spaced-apart points of anchorage of the platform on opposite sides of the crank case.

10. An attachment for a motor vehicle of the type having a crank case with lateral extensions forming a rear axle housing, including a platform member having its forward end anchored at spaced-apart points on opposite sides of the crank case, in combination with central longitudinal means for suspending the platform from the crank case, said means including a central, longitudinally extending lever rigidly supported upon a rear portion of the crank case and having its forward end secured to the top of the crank case.

11. An attachment for a motor vehicle of the type having a crank case with lateral extensions forming a rear axle housing, including a platform member having its forward end anchored at spaced-apart points on opposite sides of the crank case, in combination with central longitudinal means for suspending the platform from the crank case, said means including a central, longitudinally extending lever rigidly supported upon a rear portion of the crank case and having its forward end secured to the top of the crank case and with an intermediate portion free from engagement with said crank case.

12. An attachment for a motor vehicle of the type having a crank case with lateral extensions forming a rear axle housing, including a platform member having its forward end anchored at spaced-apart points on opposite sides of the crank case, in combination with central longitudinal means for suspending the platform from the crank case, said means including a central, longitudinally extending lever rigidly supported upon a rear portion of the crank case and having its forward end secured to the top of the crank case, the point of rear support of the suspension means by the crank case being substantially above the level and nearly in the vertical plane of and approximately midway between the spaced-apart points of anchorage of the platform on opposite sides of the crank case.

13. An attachment for a motor vehicle of the type having a crank case with lateral extensions forming a rear axle housing, including a platform member having its forward end anchored at spaced-apart points on opposite sides of the crank case, in combination with central longitudinal means for suspending the platform from the crank case, said means including a central, longitudinally extending lever rigidly supported upon a rear portion of the crank case and having its forward end secured to the top of the crank case and with an intermediate portion free from engagement with said crank case, the point of rear support of the suspension means by the crank case being substantially above the level and nearly in the vertical plane of and approximately midway between the spaced-apart points of anchorage of the platform on opposite sides of the crank case.

14. A tractor attachment comprising a diagonally and vertically braced cast metal platform, the forward end of which has means for securing it at spaced-apart points centrally of the rear axle housing in combination with a single channel iron bearing on and secured to the top portions of the crank case above the level of the platform and connected to the latter.

15. A tractor attachment comprising a diagonally and vertically braced cast metal platform, the forward end of which has means for securing it at spaced-apart points centrally of the rear axle housing in combination with a single channel iron bearing on and secured to the top portions of the crank case above the level of the platform and connected to the latter centrally.

16. An attachment for a motor vehicle of the type having a crank case with lateral extensions having enlarged central portions bolted to said case to form a rear axle housing, said attachment including a platform formed of spaced-apart bracket members connected by lateral bracing means, said members having at the forward ends spaced-apart portions embracing the crank case and laterally bolted to said enlarged central portions of the axle housing, adjacent the top and bottom of each enlargement, and forwardly diverging lateral braces secured to the platform and anchored on the axle housing, in combination with means for suspending the platform, said means including a forwardly and upwardly extending lever fulcrumed on a rear portion of the crank case and having a forward portion secured to the top of the crank case.

17. An attachment for a motor vehicle of the type having a crank case with lateral extensions having enlarged central portions bolted to said case to form a rear axle housing, said attachment including a platform formed of spaced-apart bracket members connected by lateral bracing means, said members having at the forward ends spaced-apart portions embracing the crank case and laterally bolted to said enlarged central portions of the axle housing, adjacent the top and bottom of each enlargement, and forwardly diverging lateral braces secured to the platform and anchored on the axle housing, in combination with means for suspending the platform, said means including a forwardly and upwardly extending lever fulcrumed on a rear portion of the crank case and having a forward portion secured to the top of the crank case at a point remote from the fulcrum.

18. An attachment for a motor vehicle of the type having a crank case with lateral extensions having enlarged central portions bolted to said case to form a rear axle housing, said attachment including a platform formed of spaced-apart bracket members connected by lateral bracing means, said members having at the forward end spaced-apart portions embracing the crank case and laterally bolted to said enlarged central portions of the axle housing, adjacent the top and bottom of each enlargement, in combination with means for suspending the platform comprising a channel iron fulcrumed on a rear portion of the crank case and having a forward portion secured to the top of the crank case.

19. An attachment for a motor vehicle of the type having a crank case with lateral extensions having enlarged central portions bolted to said case to form a rear axle housing, said attachment including a platform formed of spaced-apart bracket members connected by lateral bracing means, said members having at the forward ends spaced-apart portions embracing the crank case and laterally bolted to said enlarged central portions of the axle housing, adjacent the top and bottom of each enlargement, in combination with means for suspending the platform comprising a channel iron fulcrumed on a rear portion of the crank case and having a forward portion secured to the top of the crank case at a point remote from the fulcrum.

20. An attachment for a motor vehicle of the type having a crank case with lateral extensions having enlarged central portions bolted to said case to form a rear axle housing, said attachment including a platform formed of spaced-apart bracket members connected by lateral bracing means, said members having at the forward ends spaced-apart portions embracing the crank case and laterally bolted to said enlarged central portions of the axle housing, adjacent the top and bottom of each enlargement, and forwardly diverging lateral braces for the platform anchored on the axle housing adjacent the ends thereof, in combination with central longitudinal means for suspending the platform from the crank case, rigidly supported upon a rear portion of the crank case and having its forward end secured to the top of the crank case.

Signed at Kent, in the county of Portage, and State of Ohio this 6th day of August, A. D. 1929.

PAUL H. DAVEY.